United States Patent
Meyer et al.

(10) Patent No.: US 8,166,622 B2
(45) Date of Patent: May 1, 2012

(54) MACHINE FOR MACHINING OPTICAL WORKPIECES, IN PARTICULAR PLASTIC SPECTACLE LENSES

(75) Inventors: Urs Meyer, Lenzburg (CH); Marc Savoie, Wetzlar (DE)

(73) Assignee: Satisloh AG, Baar (CH)

(*) Notice: Subject to any disclaimer, the term of this patent is extended or adjusted under 35 U.S.C. 154(b) by 1165 days.

(21) Appl. No.: 11/977,181

(22) Filed: Oct. 23, 2007

(65) Prior Publication Data
US 2008/0098584 A1    May 1, 2008

(30) Foreign Application Priority Data

Oct. 26, 2006   (DE) .................. 10 2006 051 006

(51) Int. Cl.
*B23P 23/00*   (2006.01)
(52) U.S. Cl. .............. 29/27 C; 29/39; 29/50; 29/56; 82/11.3; 82/12; 82/129; 82/121; 82/904
(58) Field of Classification Search .............. 29/27 R, 29/27 C, 56, 39, 41, 50, 52, 54, 56.5, 33 J; 33/28, 18.1; 30/164.9, 164.95; 82/11, 11.3, 82/12, 120, 121, 129, 159, 904
See application file for complete search history.

(56) References Cited

U.S. PATENT DOCUMENTS

| | | | | |
|---|---|---|---|---|
| 2,367,841 A * | 1/1945 | Monroe | ............. | 407/54 |
| 4,089,262 A * | 5/1978 | Sopora | ............. | 101/4 |
| 4,254,554 A * | 3/1981 | Germano et al. | ............. | 33/561 |
| 5,485,771 A | 1/1996 | Brennan et al. | | |
| 5,678,967 A | 10/1997 | Savoie | | |
| 5,919,013 A * | 7/1999 | Savoie | ............. | 409/141 |
| 6,237,452 B1 * | 5/2001 | Ludwick et al. | ............. | 82/12 |
| 6,523,443 B1 | 2/2003 | Hof et al. | | |
| 7,278,192 B2 | 10/2007 | Schaefer | | |
| 7,429,049 B2 * | 9/2008 | Kramer | ............. | 279/2.03 |
| 7,480,970 B2 * | 1/2009 | Meyer et al. | ............. | 29/27 C |
| 2003/0183050 A1 * | 10/2003 | Savoie et al. | ............. | 82/11.3 |
| 2004/0045419 A1 | 3/2004 | Bryan et al. | | |

(Continued)

FOREIGN PATENT DOCUMENTS

DE     1 827 595     3/1961
(Continued)

OTHER PUBLICATIONS

Machine Translation of EP 849038, which EP '038 was published Jun. 1998.*

(Continued)

*Primary Examiner* — Erica E Cadugan
(74) *Attorney, Agent, or Firm* — Reising Ethington P.C.

(57) ABSTRACT

A machine for machining workpieces, for example plastic spectacle lenses, has a workpiece spindle which rotates the workpiece about a workpiece rotation axis, and a fast tool arrangement which moves a turning tool in the direction to and from the workpiece, wherein the workpiece spindle and the fast tool arrangement can moreover be moved relative to one another in a direction transverse to the workpiece rotation axis. A tool holder is connected to the fast tool arrangement and carries the turning tool. An engraving tool is spaced from the workpiece rotation axis and has an essentially point-shaped end facing towards the workpiece. The engraving tool can be moved in the direction of the workpiece and away therefrom in a highly dynamic manner via the tool holder, so that a marking can be produced on the workpiece in particular by a needling engagement of the engraving tool with the workpiece.

20 Claims, 5 Drawing Sheets

U.S. PATENT DOCUMENTS

| | | |
|---|---|---|
| 2006/0253220 A1 | 11/2006 | McPherson et al. |
| 2006/0260447 A1 | 11/2006 | Savoie et al. |
| 2006/0260448 A1 | 11/2006 | Fiedler et al. |
| 2007/0094857 A1 | 5/2007 | Savoie |

FOREIGN PATENT DOCUMENTS

| | | |
|---|---|---|
| DE | 74 19 553 U | 11/1974 |
| DE | 35 34 920 C2 | 5/1989 |
| DE | 42 27 268 A1 | 2/1994 |
| DE | 102 24 126 A1 | 1/2004 |
| DE | 102005052314 A1 * | 5/2007 |
| EP | 849038 A2 * | 6/1998 |
| EP | 1 449 616 A1 | 8/2004 |
| EP | 1719584 A1 * | 11/2006 |
| EP | 1916060 A1 * | 4/2008 |
| GB | 1 362 484 A | 8/1974 |
| WO | WO-97/13603 A2 * | 4/1997 |
| WO | WO 99/33611 | 7/1999 |
| WO | WO 02/06005 A1 | 1/2002 |

OTHER PUBLICATIONS

Machine Translation of DE 3534920, which DE '920 was published May 1987.*

Abstract of DE 4227268-A1, which DE '268 was published Feb. 1994.*

* cited by examiner

MACHINE FOR MACHINING OPTICAL WORKPIECES, IN PARTICULAR PLASTIC SPECTACLE LENSES

TECHNICAL FIELD

The present invention relates to a machine for machining optical workpieces, in particular plastic spectacle lenses. The invention also relates to a tool holder for such a machine.

PRIOR ART

In the machining of plastic spectacle lenses, there is usually a spectacle lens blank injection-molded from plastic, which has a standardised finished convex outer surface with a spherical, aspherical or progressive shape for example. The machining process serves to give the inner surfaces or prescription surfaces, which are usually concave, a spherical, aspherical, toric, atoric, progressive or free-form geometry (varifocal surfaces), depending on the desired optical effect. The typical conventional procedure when machining the inner surfaces comprises, after placing the spectacle lens blank with its outer surface on a block piece, a milling or turning (lathe) process in order to produce the optically active shape, usually followed by a fine grinding or polishing process in order to achieve the required surface quality, although this may be superfluous in the case of a spectacle lens produced by turning.

For the turning (lathe) process, in the prior art use is also made of so-called fast tool turning machines, in which a turning tool can be moved highly dynamically either in a linear reciprocating manner (see e.g. WO-A-02/06005 or the generic document WO-A-97/13603) or in rotation (cf. for example WO-A-99/33611), so that lens surfaces which are not rotationally symmetrical can be produced in the turning method with very good surface qualities.

Following production of the spectacle lens surface with the desired addition power, the spectacle lens must be provided with a marking in particular for subsequent machining processes, namely the so-called "edging" process, i.e. the edge machining of the spectacle lens in order to adapt it to the respective spectacle frame. For example, a varifocal spectacle lens according to DIN EN ISO 8980-2 must be permanently marked at least with the following details: a) alignment reference marking; this must consist of at least two markings at a distance of 34 mm and must be arranged symmetrically with respect to a vertical plane through the fitting point or prism reference point; b) details regarding the addition power, in diopters; and c) details regarding the manufacturer or supplier or brand name or trade mark. As optional, non-permanent markings, this standard moreover recommends further markings for alignment purposes, for the far reference point, for the near reference point, for the fitting point and for the prism reference point.

While the permanent markings are usually formed by permanent engravings, of which the functional engravings, i.e. the engravings required by the optician for the alignment and allocation of the respective spectacle lens, are usually designed to be so fine that they cannot be seen with the naked eye under normal light, the non-permanent markings are formed for example by means of a temporary stamped image which is removed again in the course of finishing the spectacle lens.

Furthermore, some spectacle lens manufacturers also provide permanent individual engravings on the spectacle lens, e.g. the engraving of the initials of the spectacle lens wearer, which is intended to emphasize the fact that the spectacle lenses are custom-made and is applied at a point on the spectacle lens where it does not impair vision.

The application of the permanent engravings usually takes place in an engraving machine which is separate from the actual machining machine and in which an engraving tool which is driven in rotation and comprises a geometrically defined cutting edge (milling tool) or a geometrically undefined cutting edge (grinding tool) in defined machining engagement is guided over the spectacle lens surface to be marked in order to form the engraving. However, engraving machines are also known in which the engraving is applied to the spectacle lens by means of a laser beam.

In order to avoid the additional use of special diamond tools or high-energy laser radiation for applying markings to the spectacle lens surface, the generic document WO-A-97/13603 proposes to produce these markings directly during the machining process using the tool which is also used for the turning operation, as a result of which all the reproducibility problems that occur upon each machine change are said to be eliminated. For the actual turning process, this tool must have a turning cutting edge with a defined cutting edge geometry. However, with such a turning cutting edge, it is only possible to produce markings which consist of fine lines running parallel to the cutting edge. It would be desirable if here too, as in the known engraving machines, any graphic symbol could be produced in a detailed manner, such as letters, numbers, company logos, etc.

SUMMARY OF THE INVENTION

Starting from the prior art according to WO-A-97/13603, the object of the invention is to provide a machine for machining optical workpieces, in particular plastic spectacle lenses, comprising a fast tool arrangement, by means of which it is also possible to apply any desired, finely detailed markings to the workpiece without the workpiece having to be reclamped or unclamped for this purpose.

According to the invention, a machine for machining optical workpieces, in particular plastic spectacle lenses, which comprises a workpiece spindle, by means of which the workpiece can be driven in rotation about a workpiece rotation axis, and a fast tool arrangement, by means of which a turning tool can be moved in the direction of the workpiece and away therefrom, wherein the workpiece spindle and the fast tool arrangement can moreover be moved relative to one another in a direction transverse to the workpiece rotation axis, has a tool holder which is actively connected to the fast tool arrangement and which carries the turning tool and, at a distance therefrom in the direction transverse to the workpiece rotation axis, an engraving tool, of which the end facing towards the workpiece is essentially point-shaped, wherein the engraving tool can be moved in the direction of the workpiece and away therefrom in a highly dynamic manner by means of the fast tool arrangement via the tool holder, so that a marking can be produced on the workpiece in particular by the needling engagement of the engraving tool with said workpiece.

With the engraving tool arranged on the tool holder next to and parallel to the turning tool, in the working area one and the same machining machine can thus provide the workpiece with a permanent engraving immediately after the actual turning process using one and the same fast tool arrangement, without the workpiece having to be reclamped on a separate engraving machine for this purpose, which is conducive to a fast and accurate machining process. Since a tool that is different from the turning tool is used here, namely the engraving tool, of which the end facing towards the workpiece is essentially point-shaped, then unlike in the generic prior art the geometry of the marking that can be produced is not limited by the geometry of the turning tool. Very finely detailed engravings can be produced in particular by the needling engagement of the sharp engraving tool with the workpiece, i.e. by an engraving machining in which the engraving tool strikes the workpiece in rapid succession in the same way as a woodpecker strikes a tree. Furthermore, in the machine according to the invention, the engraving of the workpiece does not result in any wear on the turning tool, in the same way as the turning of the workpiece does not result in any wear on the engraving tool, which increases the life of the tools compared to the generic prior art. This is particularly important against the background that a blunt engraving tool might only push the material of the workpiece away during the engraving machining but the material then generally comes back, which may lead to undesirable "ageing" or "dulling" of the engraved image, especially in the case of the plastics material CR39.

Although it is preferred, particularly with regard to the easiest possible mathematics when adjusting the movement axes, if the engraving tool can be moved in the axial direction in a positionally controlled manner by means of the fast tool arrangement via the workpiece holder, the basic concept of the present invention, namely the parallel arrangement of a turning tool and an engraving tool on a common tool holder which is driven by the fast tool arrangement, can also be implemented on a machine with a rotational fast tool arrangement, as is known for example from WO-A-99/33611.

Although the tip of the engraving tool may in principle also be designed in a pyramid shape with a base having three or four corners for example, nevertheless with regard to simple subsequent sharpening of the engraving tool it is preferred if the engraving tool has a tip which tapers in an essentially cone-shaped manner towards its end facing towards the workpiece.

Depending on the material of the workpiece to be marked, various materials are conceivable for the tip of the engraving tool, e.g. hardened steel, PCD, CVD or natural diamond. However, particularly with regard to the longest possible life of the engraving tool when machining plastic spectacle lenses and with regard to moderate production costs for the engraving tool, it is preferred if the tip, which forms the end of the engraving tool facing towards the workpiece, is made of carbide.

The tool holder according to the invention comprises a base plate, which can be fixed to a pendulum part of a fast tool arrangement of the machine, and at least two mounts arranged on the base plate spaced apart from one another in a direction transverse to a movement direction of the pendulum part, one of which mounts serves to fix the turning tool while the other serves to fix a functional element selected from a group consisting of engraving tools, sensors and optionally further turning tools. This tool holder allows on the one hand, as already mentioned above, the engraving of the workpiece immediately after the actual turning process using one and the same fast tool arrangement, without the workpiece having to be reclamped on a separate engraving machine for this purpose. On the other hand, this tool holder may advantageously also carry further or other functional elements, depending on the respective machining requirements, such as a sensor for (in situ) geometry detection of the workpiece in the machine or a further turning tool so that, for example, pre-turning by means of a PCD or carbide turning tool held in one mount followed by finish-turning by means of a natural diamond turning tool held in the other mount can take place, without a tool change or clamping of the workpiece in another machine having to take place between these operations.

The flexibility of the tool holder according to the invention for a wide range of machining and measuring processes in the machine can furthermore be increased if the mounts are designed for releasably—as opposed to non-releasably—fixing the turning tool and the respective functional element.

If the tool holder according to the invention is to be used on a machine as described for example in the earlier German patent application DE 10 2005 021 638 A1 by the same Applicant, i.e. a machine in which the movement direction of the pendulum part of the fast tool arrangement and the workpiece rotation axis run parallel to one another, it is advantageous if at least the mount for the turning tool is attached to the base plate in a height-adjustable manner with respect to the plane in which the pendulum part can be moved, so that the height of the turning tool cutting edge can easily be adjusted with respect to the workpiece rotation axis.

It may be provided in one advantageous embodiment that the mounts in each case have a holder block, wherein the holder blocks can optionally be displaced in the longitudinal direction individually and parallel to one another with respect to the base plate for height adjustment purposes. This is particularly of interest when the two mounts are (also) to be equipped with turning tools, wherein the described embodiment allows in a simple manner individual height adjustment of the respective turning tool cutting edge with respect to the workpiece rotation axis. Adjustment of the height of the engraving tool tip with respect to the workpiece rotation axis is in any case not necessary if the rotation angle of the workpiece spindle is controlled and furthermore a positionally controlled transverse movement between the fast tool arrangement and the workpiece spindle can take place. In the latter case, any position on the workpiece which is of interest for an engraving can be approached via the aforementioned movement axes. Only the workpiece center would be able to be approached only if a precise height adjustment of the engraving tool with respect to the workpiece rotation axis is possible. In practice, however, engravings in the center of an optical lens or of a spectacle lens need not be provided.

In one particularly simple embodiment of the tool holder, it may be provided that the mounts in each case have a receiving bore, in which the turning tool or the respective functional element is releasably clamped, for example by means of a clamping screw. However, for reproducible accuracy when holding the engraving tool and also simple clamping thereof, other possibilities are also conceivable, for example the use of a small, commercially available hydraulic chuck which is attached to the base plate of the tool holder, i.e. a hydrostatic chuck such as that available for example from the company Schunk Spanntechnik, Germany.

Continuing the concept of the invention, optionally the engraving tool or the sensor can be attached to the mount for fixing the functional element, selected from the group consisting of the engraving tool and sensor, by means of a self-centring kinematic coupling which ensures in a simple manner that the engraving tool and the sensor can be reproducibly and accurately positioned on the tool holder. Such a kinematic coupling is known in principle from EP 0 865 338 B1.

In the present case, the self-centring kinematic coupling may comprise three spherical bodies, three prism grooves and an element which generates a retaining force, wherein the spherical bodies are incorporated in a fixing face of the mount in a manner offset by 120° with respect to a center axis of the mount and protrude beyond said fixing face in order to engage with the prism grooves spaced apart the same angle in a holding plate of the engraving tool or sensor, and wherein the element which generates the retaining force keeps the engraving tool or the sensor releasably in this engagement. Although this is the presently preferred embodiment of a kinematic coupling for the engraving tool or sensor, an inverse arrangement is also conceivable, with the spherical bodies on the holding plate of the engraving tool or sensor and the prism grooves in the fixing face on the tool holder side of the mount. In both cases, the element which generates the retaining force may be arranged either on the tool holder or the base plate thereof or on the engraving tool/sensor or the holding plate thereof.

Finally, it is preferred if the element which generates the retaining force comprises a magnet, in particular a permanent magnet, which allows easy replacement of the engraving tool or sensor with another engraving tool or sensor or simple swapping thereof.

BRIEF DESCRIPTION OF THE DRAWINGS

The invention will be explained in more detail below on the basis of preferred examples of embodiments and with reference to the appended, partially schematic drawings, in which identical references denote identical or corresponding parts. In the drawings.

DETAILED DESCRIPTION OF THE EXAMPLES OF EMBODIMENTS

Figure 1:
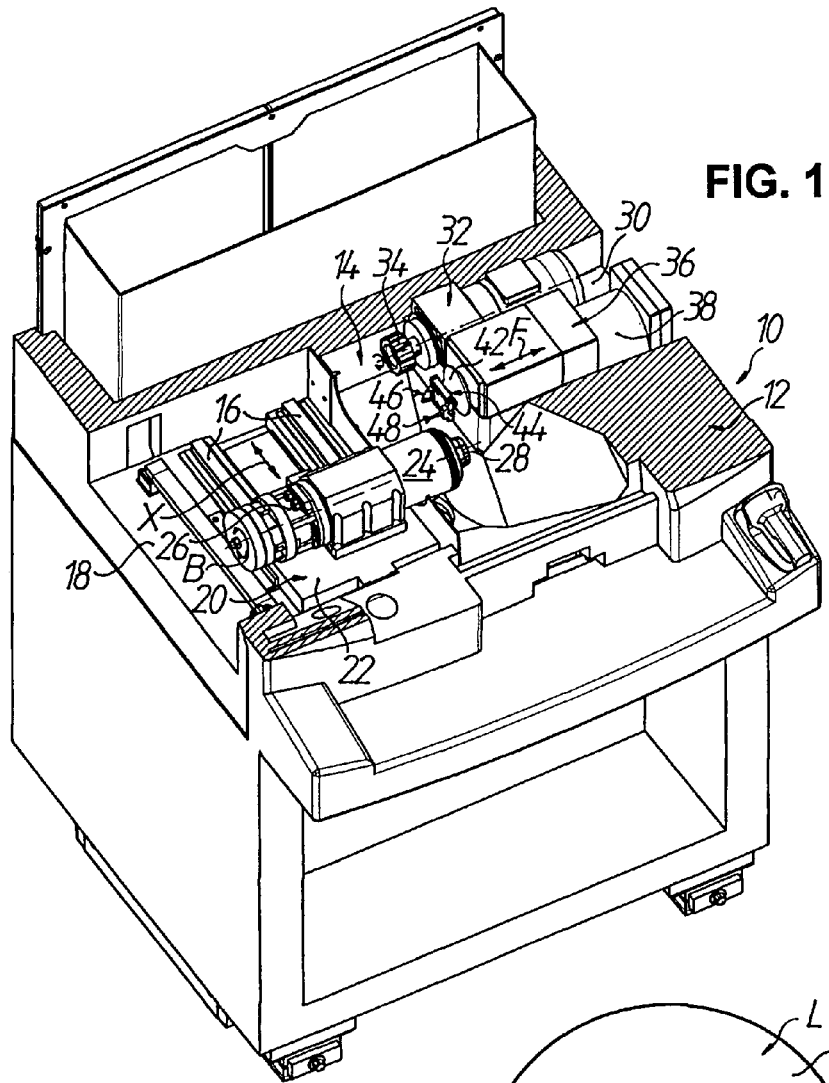
FIG. 1 shows a perspective, cut-away view of a machine according to the invention for machining optical workpieces, namely plastic spectacle lenses, obliquely from the front/top, which is equipped in tool terms with a milling and cribbing unit and a fast tool arrangement.
Figures 2, 3:
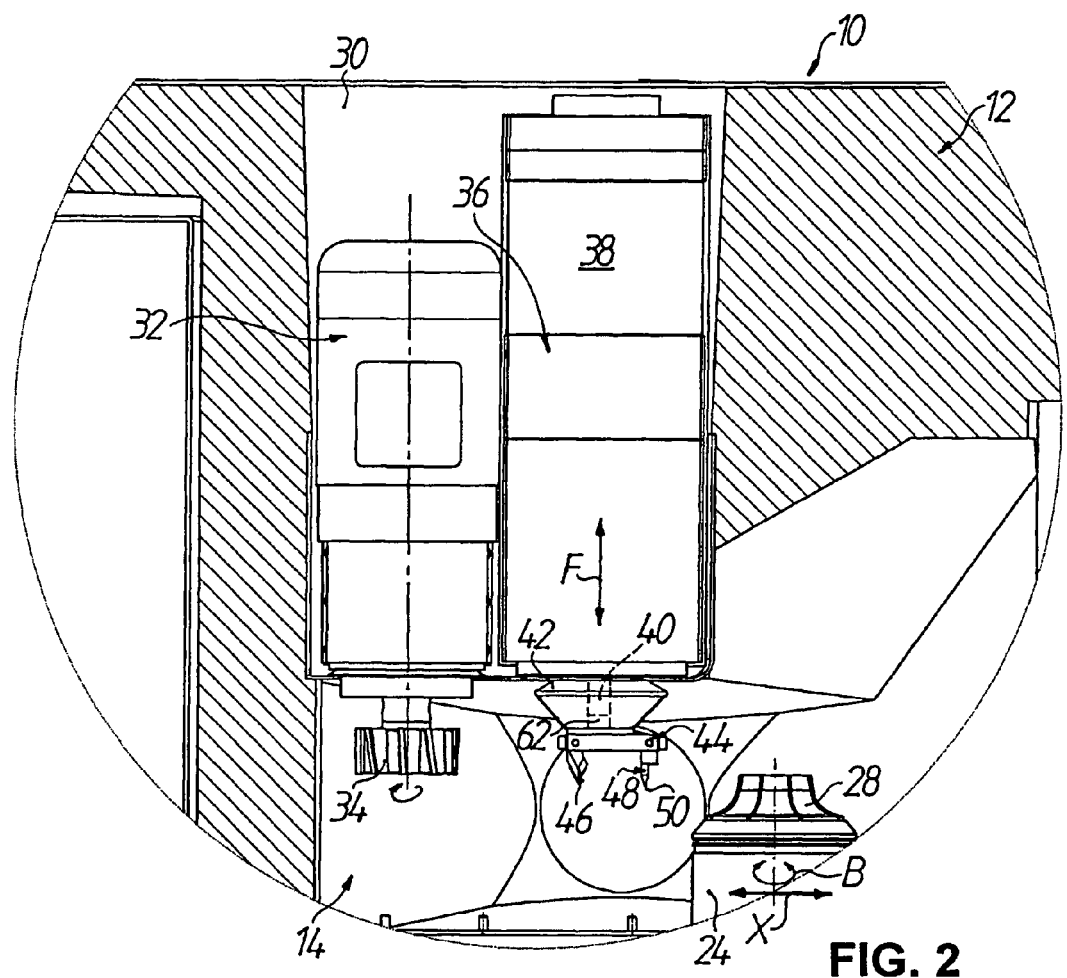
FIG. 2 shows an enlarged plan view of the machine according to FIG. 1 in the region of the milling and cribbing unit and the fast tool arrangement.
FIG. 3 shows a perspective view of the tool holder used on the fast tool arrangement of the machine according to FIG. 1, with a turning tool and an engraving tool.
Figure 4:
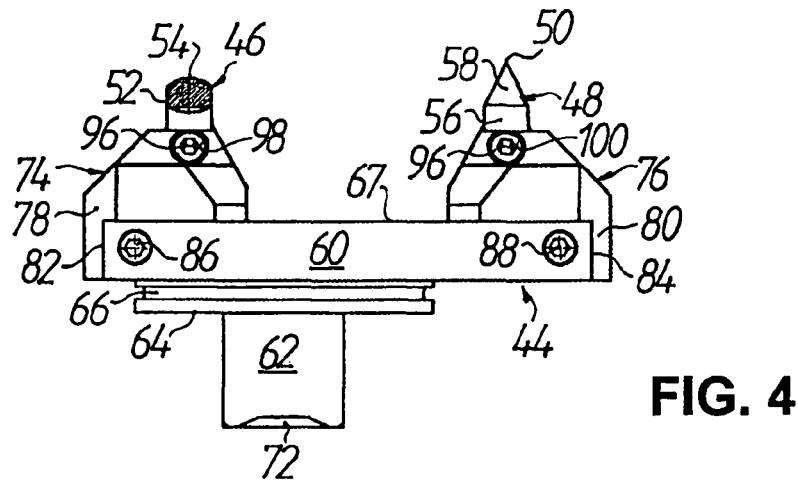
FIG. 4 shows a bottom view of the tool holder according to FIG. 3 (obliquely from the front in FIG. 3)
Figure 5:
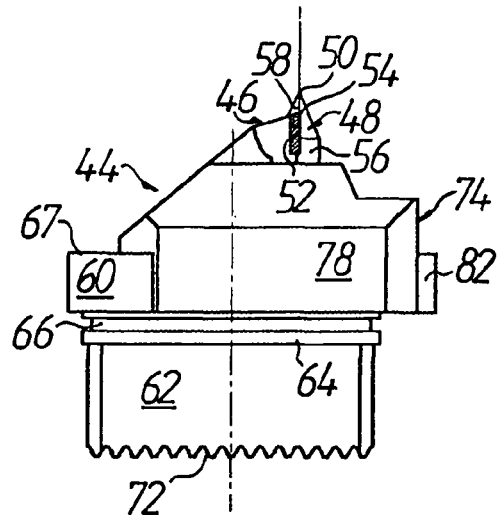
FIG. 5 shows a side view of the tool holder according to FIG. 3 (from the left in FIG. 4)

FIGS. 1 and 2 schematically show a CNC-controlled machine 10 in particular for the surface machining of spectacle lenses L made of plastic (see FIG. 7), in which the machine frame 12 which is cast in one piece from a polymer concrete is cut away in the region of the machine upper part in order to make it possible to see into a working space or machining area 14 of the machine 10. The machine 10 as such, without the engraving function, has already been described in the earlier German patent application DE 10 2005 021 638 A1 by the same Applicant, to which reference is additionally made here with regard to the basic structure of the machine and the function thereof.

On the left-hand side of the machining area 14 in FIG. 1, two guide rails 16 which extend parallel to one another in a (horizontal) width direction of the machine 10 are fixed to an upper mounting surface 18 of the machine frame 12 in FIG. 1. An X-carriage 20, which can be moved in a CNC-controlled manner in both directions of an X-axis by associated CNC drive and control elements (not shown), is mounted in a displaceable manner on the guide rails 16.

Fixed to an upper mounting surface 22 of the X-carriage 20 in FIG. 1 is a workpiece spindle 24 which can be driven in rotation at a CNC-controlled speed and angle about a workpiece rotation axis B by means of an electric motor 26. Provided on the workpiece spindle 24, or more specifically the end thereof which protrudes into the machining area 14, is a workpiece holder 28, on which the spectacle lens L (not shown in FIGS. 1 and 2), which is blocked onto a block piece in a manner known per se, can be placed in such a way that it can rotate in the same axis as the workpiece spindle 24, in order to machine in particular the prescription surface R of the spectacle lens L.

Mounted next to one another on the right-hand side of the machining area 14 in FIG. 1, on a further horizontal mounting surface 30 of the machine frame 12, are firstly an optional milling unit 32 for the edge machining of the spectacle lens L, more specifically for the edging thereof in a manner known per se (also known as cribbing) by means of a milling tool 34 which can be driven in rotation, and secondly a fast tool arrangement 36 for the turning machining of the prescription surface R of the spectacle lens L.

During the edge machining operation, a (pre-) machining of the spectacle lens blank can be performed by means of the rotating milling tool 34, e.g. on a peripheral contour which already largely corresponds to the peripheral contour prescribed by the spectacle frame shape, wherein peripheral contours differing from the circular shape can be produced by suitable dynamic displacement of the X-carriage 20 carrying the workpiece spindle 24 in the X-axis, i.e. towards the milling unit 32 and away therefrom, while the spectacle lens blank revolves.

In FIGS. 1 and 2 respectively, the fast tool arrangement 36 is provided in front of and next to the milling unit 32. As known for example from WO-A-02/06005, the fast tool arrangement 36 comprises an actuator 38 and an associated pendulum part 40 (also known as a "shuttle"). The latter is hidden by a bellows 42 in FIG. 1, but is indicated by dashed lines in FIG. 2. The internal structure of the fast tool arrangement 36 shown here is described in detail in the earlier German patent application DE 10 2005 052 314 A1 by the same Applicant, to which reference is expressly made hereby in this respect. The pendulum part 40 of the fast tool arrangement 36 can be moved axially in both directions of a fast tool axis F by means of the actuator 38. Here, the position and stroke of the pendulum part 40 can be controlled by CNC. As shown in particular in FIG. 2, the rotation axis of the milling unit 32, the fast tool axis F and the workpiece rotation axis B run parallel to one another, while the X-axis of the X-carriage 20 runs at a right angle in relation thereto.

As will be described in greater detail below, a tool holder 44 is actively connected to the fast tool arrangement 36, which tool holder carries a turning tool 46 and, at a distance therefrom in a direction transverse to the workpiece rotation axis B (see FIG. 2), an engraving tool 48, of which the end 50 facing towards the spectacle lens L and the workpiece spindle 24 is essentially point-shaped. As a result, the engraving tool 48 can be moved in the direction of the spectacle lens L and away therefrom in a highly dynamic manner by means of the fast tool arrangement 36 via the tool holder 44, so that a marking can be produced on the spectacle lens L in particular by the needling engagement of the engraving tool 48 with said spectacle lens, as will likewise be explained in more detail below.

As shown in FIGS. 3 to 6, a cutting plate 52 is attached to the turning tool 46 optionally releasably or as a coating, which forms a cutting edge 54 and, depending on the respective requirements, in particular specifically for the material to be machined, may be made from polycrystalline diamond (PCD), CVD, natural diamond or else carbide with or without a wear-resistant coating.

By means of the fast tool arrangement 36, the prescription surface R of the spectacle lens L can be machined by turning, which takes place in a manner known per se while controlling the movement of the spectacle lens L in the X-axis, while controlling the movement of the machining turning tool 46 in the F-axis and while controlling the rotational movement of the spectacle lens L about the workpiece rotation axis B. During this turning machining, it is possible to achieve surface qualities which correspond almost to the surface quality achievable with conventional polishing methods.

Further details regarding the tool holder 44 and the engraving tool 48 mounted releasably thereon can be seen in FIGS. 3 to 6. Accordingly, in its simplest embodiment, the engraving tool 48 comprises a cylindrical main body 56 adjoined by a tip 58 which tapers in an essentially cone-shaped manner towards the essentially point-shaped end 50. Here, preferably at least the tip 58, which forms end 50 of the engraving tool 48 facing towards the spectacle lens L, is made of carbide.

Figure 6:
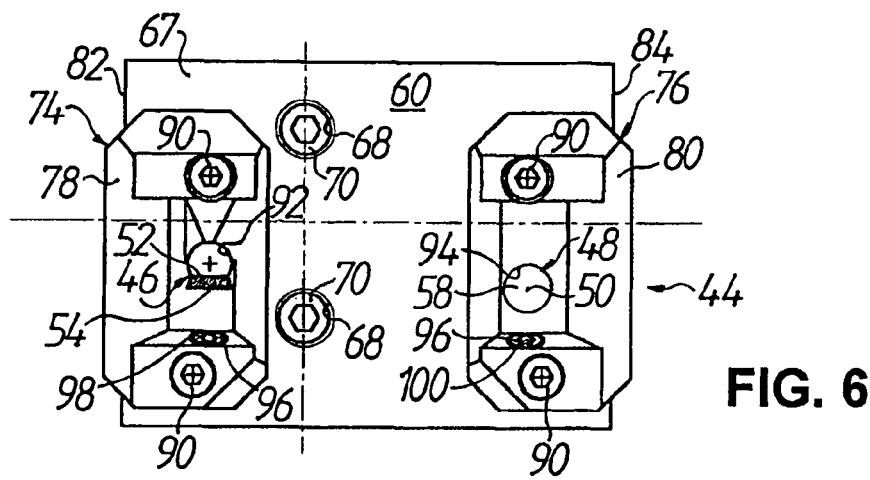
FIG. 6 shows a front view of the tool holder according to FIG. 3 (from above in FIG. 4)
Figure 8:
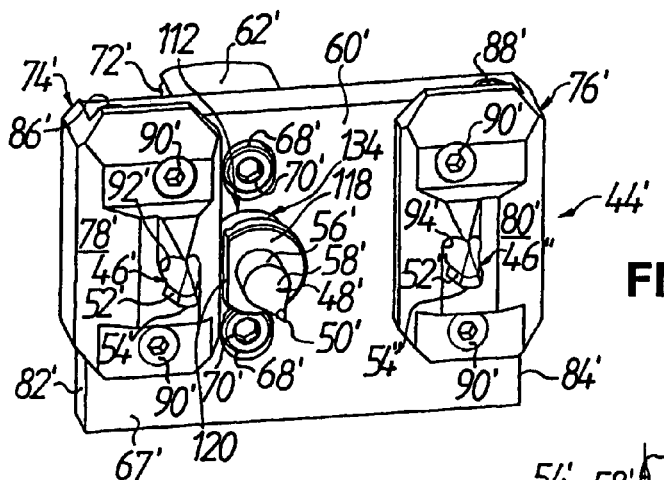
FIG. 8 shows a perspective view of a tool holder with two turning tools and one engraving tool, which is an alternative to the tool holder shown in FIGS. 1 to 6.
Figure 9:
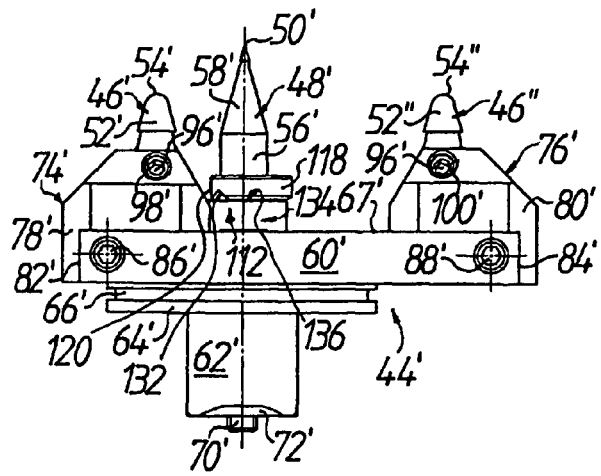
FIG. 9 shows a bottom view of the tool holder according to FIG. 8 (from below in FIG. 8)
Figure 10:
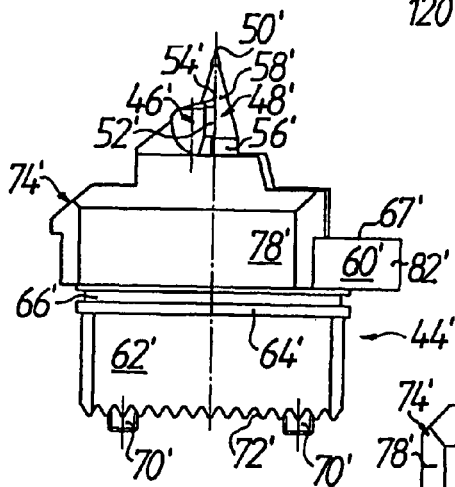
FIG. 10 shows a side view of the tool holder according to FIG. 8 (from the left in FIG. 9)
Figure 11:
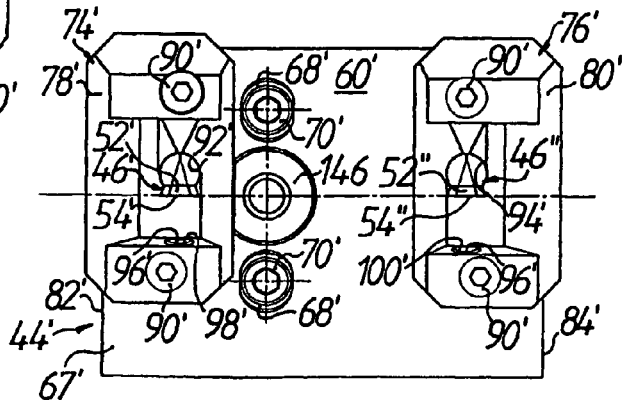
FIG. 11 shows a front view of the tool holder according to FIG. 8 (from above in FIG. 9), wherein the engraving tool has been removed from the tool holder and a magnet insert as an element which generates the retaining force for the engraving tool has been removed from a bore of the tool holder.
Figure 12:
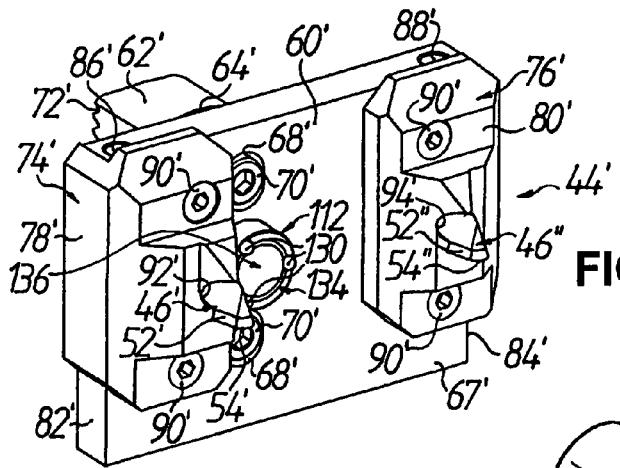
FIG. 12 shows a perspective view, largely corresponding to FIG. 8, of the tool holder according to FIG. 8, wherein the engraving tool has been removed from the tool holder so that it is possible to see the magnet insert for generating the retaining force for the engraving tool, which magnet insert protrudes beyond a base plate of the tool holder.

The tool holder 44 comprises a base plate 60 which is rectangular in the front view shown in FIG. 6 and which is made for example from an aluminum alloy, which base plate can be fixed to the pendulum part 40 of the fast tool arrangement 36 via an essentially cube-shaped connection piece 62. A round disc 64 is inserted between the base plate 60 and the connection piece 62 (or is optionally formed in one piece with the connection piece 62), said round disc being provided with an annular groove 66 on its outer circumference which serves for fixing the bellows 42 (shown in FIGS. 1 and 2) to the tool holder 44.

Starting from the upper end face 67 of the base plate 60 in FIG. 3, two stepped cutouts 68 in identical and aligned through-bores (not shown) in the disc 64 and the connection piece 63 are passed through by a respective fixing screw 70, only the screw heads of which are shown in FIGS. 3 and 6 for the sake of simplifying the drawing. The length of the fixing screws 70 is such that they can protrude downwards beyond the connection piece 62 in FIGS. 4 and 5 (not shown), so as to be screwed by their protruding threaded portions into associated threaded bores (not shown) in the pendulum part 40 of the fast tool arrangement 36. In this way, the tool holder 44 is pulled against the pendulum part 40 of the fast tool arrangement 36 in order to releasably connect the tool holder 44 and the pendulum part 40 to one another. In the illustrated example of embodiment, the end face of the connection piece 62 which faces towards the pendulum part 40 is provided with a profiling in the form of a toothing 72, which engages with a profiling or toothing of complementary shape (not shown) at the end of the pendulum part 40 protruding into the machining area 14 so as also to fix the tool holder 44 to the pendulum part 40 in a form-fitting manner.

Arranged on the side of the base plate 60 facing away from the connection piece 62 are two mounts 74, 76 which are spaced apart from one another in a direction transverse to the movement direction (F-axis) of the pendulum part 40, one of said mounts (74) serving to fix the turning tool 46 while the other (76) in the illustrated example of embodiment is provided for fixing the engraving tool 48.

Each mount 74, 76 has a holder block 78, 80 which is essentially L-shaped when seen in cross section (cf. FIGS. 3 and 4) and which is guided in a longitudinally displaceable manner on the respectively associated side face 82, 84 of the base plate 60. Here, a protrusion (not shown) attached to the underside of the respective holder block 78, 80 engages in a respectively associated longitudinal groove (likewise not shown) provided parallel to the side faces 82, 84 in the end face 67 of the base plate 60. In order to adjust the respective holder block 78, 80, an internal thread or a nut (neither shown) is provided on said protrusion and cooperates with a respectively associated threaded spindle 86, 88 with a differential thread which extends through the base plate 60 in each case parallel to the end face 67 and the side faces 82, 84 thereof and is mounted rotatably therein in a suitable manner.

It can be seen that the respective holder block 78, 80 can thus be displaced along the respective side face 82, 84 of the base plate 60 by turning the respectively associated threaded spindle 86, 88. As a result, the holder blocks 78, 80 can optionally be displaced individually and parallel to one another relative to the base plate 60, so that the height position of the cutting edge 54 of the turning tool 46 or the essentially point-shaped end 50 of the engraving tool 48 can be adjusted individually with respect to a plane passing through the B-axis and the X-axis of the machine 10. In its respective height position, the holder block 78 or 80 can then be fixed or clamped with respect to the base plate 60 by means of clamping screws 90 which pass through the respective holder block 78, 80.

The mounts 74, 76 are furthermore designed to releasably fix the turning tool 46 and the engraving tool 48. For this purpose, starting from its upper end face in FIGS. 3 to 5, each mount 74, 76 has a receiving bore 92, 94 formed in the holder block 78 and 80, in which the turning tool 46 is releasably clamped by its shaft and respectively the engraving tool 48 is releasably clamped by its main body 56. In order to clamp the tools 46, 48, in each case a clamping screw 96 is provided which is screwed into an associated threaded bore 98 and 100 in the respective holder block 78 and 80, said threaded bore running perpendicular to the receiving bore 92 and 94 and ending therein.

The turning machining (known per se) of the spectacle lens L on the machine 10 has already been sufficiently described above. Immediately after the turning machining process, the spectacle lens L can be engraved on its prescription surface R by means of the engraving tool 48 which is driven by means of the fast tool arrangement 36 via the tool holder 44. The position of the engraving tool with respect to the workpiece spindle 24, or more specifically the position of the essentially point-shaped end 50 of the engraving tool 48 in relation to the workpiece rotation axis B of the workpiece spindle 24, has previously been calibrated in a manner familiar to the person skilled in the art, for example by applying suitable sample markings to a test piece (not shown) held in the workpiece holder 28 at different angle settings of the test piece about the workpiece rotation axis B and by suitably adjusting the height of the mount 76 for the engraving tool 48 by means of the threaded spindle 88 in the workpiece holder 44. Furthermore, the spatial position of the point-shaped end 50 of the engraving tool 48 in the F- and X-axes of the machine 10 has been determined, which may likewise take place for example with the aid of a test piece and also the CNC drive and control elements of said axes in a manner familiar to the person skilled in the art.

The actual engraving process then proceeds as follows. Besides the (relative) position of the end 50 of the engraving tool 48 in the coordinate system of the machine 10, the position at which the engraving is to be applied to the prescription surface R of the spectacle lens L and also the geometry of the prescription surface R machined on the spectacle lens L by the turning tool 46 are also known. This information is used to calculate the (engraving) positions for the X- and B-axes. The positions in the X- and B-axes result from the polar coordinates of the engraving to be applied with respect to the rotation axis of the spectacle lens L and its horizontal, i.e. the workpiece spindle 24 will move in a defined linear manner in the X-axis by means of the X-carriage 20 depending on the radial distance between the engraving to be applied and the rotation axis of the spectacle lens L, while the workpiece spindle 24 will be rotated in a defined manner about the workpiece rotation axis B depending on the angular position of the engraving to be applied with respect to the rotation axis and horizontal of the spectacle lens L. The defined advance movement of the engraving tool 48 in the F-axis takes place in a manner depending on the thickness (likewise known from the above details) of the spectacle lens L at the point on the prescription surface R at which the engraving is to be applied. The depth of the engraving can be adjusted by means of suitable (multiple) advance movement of the engraving tool 48 in the F-axis.

As already mentioned above, the engraving tool 48 can then be moved in the direction of the spectacle lens L and away therefrom in a highly dynamic manner by means of the fast tool arrangement 36 via the tool holder 44, wherein the end 50 of the engraving tool 48 preferably strikes the prescription surface R in rapid succession in a needling manner, i.e. in the same way as a woodpecker strikes a tree, while the strike point is changed by positioning the spectacle lens L in the X- and B-axes depending on the engraved image to be produced. Here, the engraving tool 48 may carry out reciprocating stroke movements with e.g. a frequency between 10 and 200 Hz. However, depending on the dynamic possibilities of the fast tool arrangement 36 and the material of the spectacle lens L, engraving can be carried out at even higher frequencies, for example 700 Hz or higher.

However, as an alternative to the needling engraving machining, the engraving tool 48 can also be used in such a way that the spectacle lens L, in a position of the engraving tool 48 in which the end 50 thereof is in contact with the prescription surface R, is displaced in the X- and B-axes without the engraving tool 48 carrying out a needling movement, so that an engraved image is produced by "scoring" or "scratching".

Figure 7:
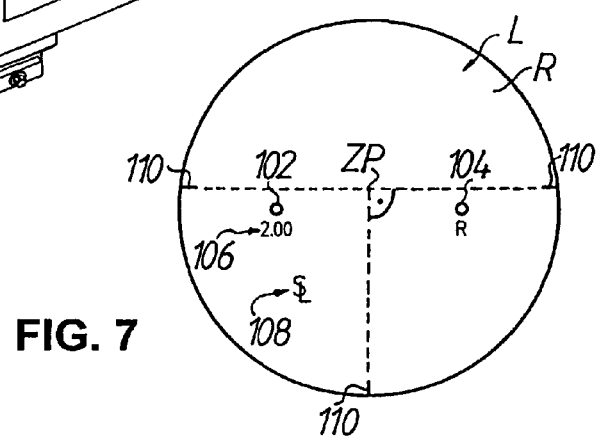
FIG. 7 shows a plan view of a spectacle lens which has been permanently engraved by the machine according to the invention.

FIG. 7 shows by way of example a prescription surface R of the spectacle lens L which has been engraved by means of the machine 10 described above, wherein the perpendicular dashed lines in FIG. 7 do not belong to the engraving but rather serve only to explain the position of part of the engraving. The prescription surface R which is shown is a varifocal surface with the permanent engraving required according to DIN EN ISO 8980-2 which comprises for alignment purposes firstly two e.g. circular markings 102, 104 spaced apart from one another by 34 mm on the lens horizontal passing through the lens center point, wherein said lens horizontal is located precisely in the middle between the two markings 102, 104. Located below the left-hand marking 102 in FIG. 7 is the information concerning the addition power 106, in the present example 2.00 diopters, while the spectacle lens L below the right-hand marking 104 in FIG. 7 is marked with "R" for right. Finally, engraved at 108 is the information concerning the manufacturer, in the present example "$^S_L$". Furthermore, engraved on the edge of the prescription surface R of the spectacle lens L are three lines 110 which indirectly mark the center point ZP of the spectacle lens L which is obtained when the lateral lines 110 in FIG. 7 are joined by a line, from which a perpendicular line is drawn to the bottom line 110 in FIG. 7 (indicated by dashed lines in FIG. 7). This center point ZP later serves for positioning the spectacle lens L for edge machining according to the shape of the spectacle frame.

FIGS. 8 to 15 show details regarding a tool holder 44' in an alternative embodiment to the embodiment described above, wherein identical or corresponding parts have been provided with the same references followed by a prime ("'"). The tool holder 44' in the alternative embodiment will be described below only in so far as it differs from the tool holder 44 described with reference to FIGS. 1 to 6; for the rest, reference will be made to the above description.

On the tool holder 44' of alternative design, firstly the second mount 76' is equipped differently than in the case of the previously described tool holder 44, namely with a second turning tool 46". The turning tools 46', 46" may differ with regard to the cutting edge material and/or cutting edge geometry, e.g. such that a pre-turning of the prescription surface R of the spectacle lens L can take place by means of the left-hand turning tool 46' in FIGS. 8, 9, 11, 12 and 15, which has a cutting plate 52' made from PCD or carbide, whereas, after the pre-turning, a finish-turning of the prescription surface R of the spectacle lens L can be carried out by means of the right-hand turning tool 46" in FIGS. 8, 9, 11, 12 and 15, which has a cutting plate 52" made from natural diamond. If the turning machining process is to be split into pre-turning and finish-turning, these machining steps can therefore be carried out immediately after one another in one and the same machining area 14, without a tool change having to be carried out on the machine 10 between these steps.

On the tool holder 44', a further mount 112 is furthermore provided on the base plate 60' between the fixing screws 70', said further mount being designed differently from the mounts 74', 76' and optionally serving for releasably fixing the engraving tool 48' or a sensor 114, wherein use is made of a self-centring kinematic coupling 116 which will be described in more detail below.

Figure 13:
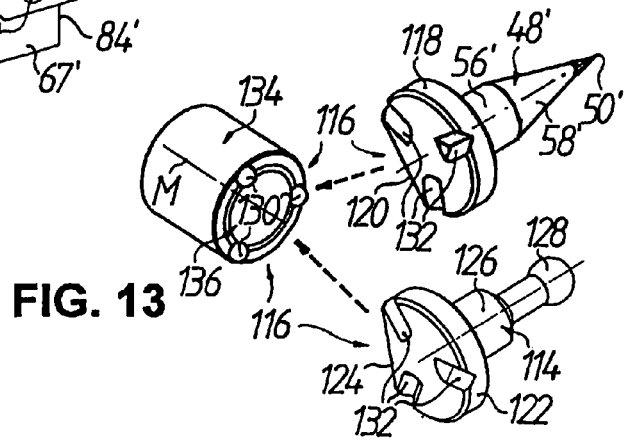
FIG. 13 shows a perspective view of the magnet insert according to FIG. 12 and of the engraving tool according to FIGS. 8 to 10 and also of a sensor which can replace this engraving tool, in order to illustrate a kinematic coupling, by means of which optionally the engraving tool or the sensor can be attached to the tool holder.

In FIG. 13, the engraving tool 48' and the sensor 114 are shown separately from the tool holder 44'. The engraving tool 48' differs from the previously described engraving tool 48 essentially in that it has at its holder-side end a holding plate 118 which is generally circular when seen in plan view and to which the main body 56' is fixed, said holding plate being provided with a flattened portion 120 at the side for angular orientation on the holder block 78' of the left-hand mount 74' in FIGS. 8, 9, 11, 12 and 15.

The sensor 114 also has a holding plate 122 which is generally circular when seen in plan view and is provided with a flattened portion 124 at the side for angular orientation purposes. A stepped cylindrical shaft 126 is fixed to the holding plate 122 (or formed in one piece with the holding plate 122) and ends with a spherical head 128 on its side remote from the holding plate 122. The sensor 114 serves for detecting the geometry on the spectacle lens L or on the spectacle lens blank with the aid of the CNC measurement technology which is present in any case on the movement axes (F and X), in a manner comparable to a coordinate measuring machine, and is—like the engraving tool 48'—advantageously removed from the tool holder 44' during turning machining (cf. FIG. 12). The sensor 114 may be used for example to calibrate the turning tools, as described for example in the earlier European patent application 05 009 894.6 (EP-A-1 719 584) by the same Applicant.

Starting from the upper end face 67 of the base plate 60 in FIG. 3, two stepped cutouts 68 in identical and aligned through-bores (not shown) in the disc 64 and the connection piece 62 are passed through by a respective fixing screw 70, only the screw heads of which are shown in FIGS. 3 and 6 for the sake of simplifying the drawing. The length of the fixing screws 70 is such that they can protrude downwards beyond the connection piece 62 in FIGS. 4 and 5 (not shown), so as to be screwed by their protruding threaded portions into associated threaded bores (not shown) in the pendulum part 40 of the fast tool arrangement 36. In this way, the tool holder 44 is pulled against the pendulum part 40 of the fast tool arrangement 36 in order to releasably connect the tool holder 44 and the pendulum part 40 to one another. In the illustrated example of embodiment, the end face of the connection piece 62 which faces towards the pendulum part 40 is provided with a profiling in the form of a toothing 72, which engages with a profiling or toothing of complementary shape (not shown) at the end of the pendulum part 40 protruding into the machining area 14 so as also to fix the tool holder 44 to the pendulum part 40 in a form-fitting manner.

Figure 14:
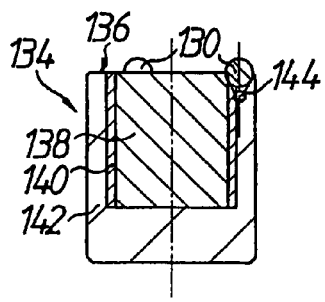
FIG. 14 shows a longitudinal sectional view through the magnet insert according to FIGS. 12 and 13.
Figure 15:
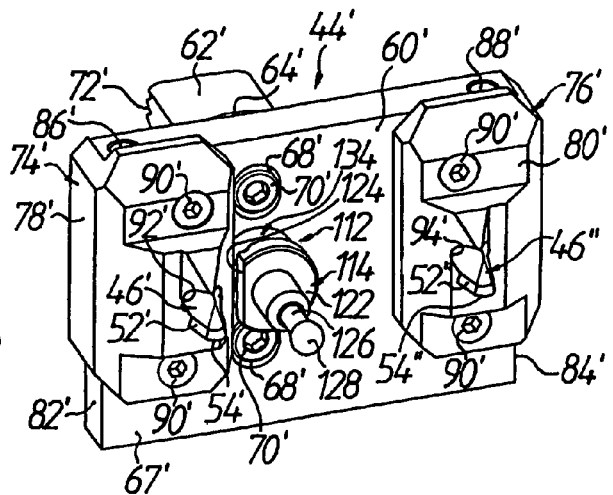
FIG. 15 shows a perspective view, largely corresponding to FIG. 8, of the tool holder according to FIG. 8, wherein the engraving tool according to FIGS. 8 to 10 and 13 has been replaced by the sensor according to FIG. 13.

Finally, details regarding the pot-shaped magnet device 134 are shown in FIG. 14. According to this figure, the pot-shaped magnet device 134 comprises a permanent magnet 138 of cylindrical shape which is inserted in a hollow-cylindrical tubular section 140 made of non-magnetic material. The permanent magnet 138 and the tubular section 140 in turn are inserted in a beaker-shaped mantle or pot 142 made of ferromagnetic material. The upper end faces of the permanent magnet 138, the tubular section 140 and the pot 142 in FIG. 14 form the flat fixing face 136 of the mount 112. This embodiment of the pot-shaped magnet device 134 ensures a relatively large magnetic retaining force, which can be attributed to the fact that a direct magnetic flux between the north and south pole of the permanent magnetic 138 can be produced via the pot 142 and magnetic scatter fields are largely avoided. It can also be seen in FIG. 14 that, starting from the fixing face 136, essentially cone-shaped bores 144 are formed in the pot-shaped magnet device 134, into which the spherical bodies 130 are glued, e.g. by means of a 2-component epoxy resin. The pot-shaped magnet device 134 itself is in turn fixed in a stepped bore 146 in the base plate 60' of the tool holder 44' (see FIG. 11), preferably is glued into the latter.

As a result, both the engraving tool 48' and the sensor 114 can be placed on the tool holder 44' always reproducibly and in the same position with respect to the base plate 60' and in relation to the turning tool 46'. Despite very high retaining forces of the pot-shaped magnet device 134, it is possible to remove the engraving tool 48' and the sensor 114 from the tool holder 44' by tilting them to the side.

Although in the above description the tool holder 44, 44' has been described in use on a machine 10 which comprises just one fast tool arrangement 36 and also optionally a milling unit 32—according to the earlier German patent application DE 10 2005 021 638 A1 by the same Applicant—the tool holder 44, 44' can of course also be used on machines which comprise more than one fast tool arrangement, optionally at least one milling spindle also for surface machining and/or a plurality of workpiece spindles, as described for example in the earlier German patent application DE 10 2005 021 640 A1 and the earlier European patent application 06 006 510.9 (EP-A-1 719 582) by the same Applicant. If in this case the arrangement of the machine is such that the fast tool movement plane is inclined by a predefined angle with respect to the plane containing the workpiece rotation axis, which—as described in detail in the earlier German patent application DE 10 2005 021 640 A1 by the same Applicant—allows easy height adjustment of the turning tool cutting edge with respect to the rotation axis of the workpiece spindle, the previously described height adjustment possibility using the respective threaded spindles 86, 88 and 86', 88' for the mounts 74, 76, 74', 76' on the tool holder 44, 44' can also be omitted, so that the respective mount would be attached to the base plate 60 or 60' in a fixed, i.e. immovable, manner. The height adjustment of the essentially point-shaped end 50 of the engraving tool 48 with respect to the workpiece rotation axis B could then take place analogously to the height adjustment of the cutting edge of the turning tool, as described in the earlier German patent application DE 10 2005 021 640 A1 by the same Applicant.

In summary, there is disclosed a machine for machining in particular plastic spectacle lenses as workpieces, comprising a workpiece spindle, by means of which the workpiece can be driven in rotation about a workpiece rotation axis, and a fast tool arrangement, by means of which a turning tool can be moved in the direction of the workpiece and away therefrom, wherein the workpiece spindle and the fast tool arrangement can moreover be moved relative to one another in a direction transverse to the workpiece rotation axis. According to the invention, a tool holder is provided which is actively connected to the fast tool arrangement and which carries the turning tool and, at a distance therefrom in the direction transverse to the workpiece rotation axis, an engraving tool, of which the end facing towards the workpiece is essentially point-shaped. The engraving tool can be moved in the direction of the workpiece and away therefrom in a highly dynamic manner by means of the fast tool arrangement via the tool holder, so that a marking can be produced on the workpiece in particular by the needling engagement of the engraving tool with said workpiece.

We claim:
1. A machine for machining optical workpieces, comprising
   a workpiece spindle, by means of which a workpiece can be driven in rotation about a workpiece rotation axis, and
   a fast tool arrangement, including an actuator for reciprocating a turning tool in the direction towards the workpiece and away therefrom, wherein the workpiece spindle and the fast tool arrangement can moreover be moved relative to one another in a direction transverse to the workpiece rotation axis;

the machine further comprising a tool holder which is actively connected to the fast tool arrangement so as to be reciprocated by the actuator and which tool holder carries the turning tool and, at a distance therefrom in the direction transverse to the workpiece rotation axis, carries an engraving tool, the engraving tool having an end facing towards the workpiece that is in the form of a punctiform sharp point, wherein the engraving tool can be moved in the direction towards the workpiece and away therefrom by means of the actuator of the fast tool arrangement via the tool holder, so that a marking can be produced on the workpiece by a needling engagement of the engraving tool with said workpiece, and wherein the turning tool is mounted to the tool holder so as to be selectively movable relative to the tool holder and the engraving tool in a turning tool movement direction transverse to the workpiece rotation axis.

2. A machine according to claim 1, wherein the engraving tool can be moved in an axial direction in a positionally controlled manner by means of the fast tool arrangement via the tool holder.

3. A machine according to claim 1, wherein the engraving tool has a tip which tapers in an essentially cone-shaped manner towards its end facing towards the workpiece.

4. A machine according to claim 3, wherein the tip, which forms the end of the engraving tool facing towards the workpiece, is made of carbide.

5. A machine according to claim 1, wherein the tool holder has a base plate, which can be fixed to a pendulum part of the fast tool arrangement of the machine, and two mounts arranged on the base plate spaced apart from one another in a direction transverse to a movement direction of the pendulum part, one of which mounts serves to fix the turning tool while the other serves to fix the engraving tool.

6. A machine according to claim 5, wherein the mounts are designed for releasably fixing the turning tool and the engraving tool, respectively.

7. A machine according to claim 6, wherein the selective movement of the turning tool is a selective movement of the turning tool relative to the base plate in a height-adjustable manner with respect to a plane in which the pendulum part can be moved.

8. A machine according to claim 7, wherein the mounts in each case have a holder block, wherein the holder blocks can each selectively be displaced in the turning tool movement direction individually and parallel to one another with respect to the base plate for height adjustment purposes to achieve said selective movement of the turning tool and to also achieve selective movement of the engraving tool.

9. A machine according to claim 8, wherein the mounts in each case have a receiving bore, in which a respective one of the turning tool and the engraving tool is releasably clamped.

10. A machine according to claim 6, wherein the mounts in each case have a receiving bore, in which a respective one of the turning tool and the engraving tool is releasably clamped.

11. A machine according to claim 5, wherein the engraving tool can be attached to the mount for fixing the engraving tool, by a self-centering kinematic coupling.

12. A machine according to claim 11, wherein the self-centering kinematic coupling comprises three spherical bodies, three prism grooves and an element which generates a retaining force, wherein the spherical bodies are incorporated in a fixing face of the engraving tool mount in a manner offset by 120° from one another with respect to a center axis of the engraving tool mount and protrude beyond said fixing face in order to engage with the prism grooves spaced apart from one another by the same angle in a holding plate of the engraving tool, and wherein the element which generates the retaining force keeps the engraving tool releasably in engagement with the engraving tool mount.

13. A machine according to claim 12, wherein the element which generates the retaining force comprises a magnet.

14. A machine according to claim 13, wherein the magnet is a permanent magnet.

15. A machine according to claim 5, wherein the selective movement of the turning tool is a selective movement of the turning tool relative to the base plate in a height-adjustable manner with respect to a plane in which the pendulum part can be moved.

16. A machine according to claim 15, wherein the mounts in each case have a holder block, wherein the holder blocks can each selectively be displaced in the turning tool movement direction individually and parallel to one another with respect to the base plate for height adjustment purposes to achieve said selective movement of the turning tool and to also achieve selective movement of the engraving tool.

17. A machine according to claim 5, wherein the tool holder includes an additional mount for an additional turning tool engraving tool.

18. A machine according to claim 5, further comprising a sensor, wherein the engraving tool mount for fixing the engraving tool releasably fixes the engraving tool, and, when the engraving tool is removed therefrom, the sensor is able to be releasably mounted thereto.

19. A machine according to claim 18, wherein a self-centering kinematic coupling is provided for releasably alternatively fixing the engraving tool and the sensor to the engraving tool mount.

20. A machine according to claim 19, wherein the self-centering kinematic coupling comprises three spherical bodies, three prism grooves and an element which generates a retaining force, wherein the spherical bodies are incorporated in a fixing face of the engraving tool mount in a manner offset by 120° from one another with respect to a center axis of the engraving tool mount and protrude beyond said fixing face in order to engage with the prism grooves spaced apart from one another by the same angle in a holding plate of the engraving tool and a holding plate of the sensor, and wherein the element which generates the retaining force keeps the engraving tool and the sensor, respectively, releasably in engagement with the engraving tool mount.

* * * * *

UNITED STATES PATENT AND TRADEMARK OFFICE
CERTIFICATE OF CORRECTION

PATENT NO. : 8,166,622 B2  
APPLICATION NO. : 11/977181  
DATED : May 1, 2012  
INVENTOR(S) : Urs Meyer et al.

It is certified that error appears in the above-identified patent and that said Letters Patent is hereby corrected as shown below:

IN THE CLAIMS

Claim 17, Column 14, Line 34 - After "tool", delete "engraving tool".

Signed and Sealed this  
Seventeenth Day of July, 2012

David J. Kappos  
*Director of the United States Patent and Trademark Office*